(12) United States Patent
Kumano

(10) Patent No.: US 9,628,700 B2
(45) Date of Patent: Apr. 18, 2017

(54) IMAGING APPARATUS, IMAGING ASSIST METHOD, AND NON-TRANSITORY RECODING MEDIUM STORING AN IMAGING ASSIST PROGRAM

(71) Applicant: OLYMPUS CORPORATION, Hachioji-shi, Tokyo (JP)

(72) Inventor: Takafumi Kumano, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/748,283

(22) Filed: Jun. 24, 2015

(65) Prior Publication Data

US 2015/0296132 A1 Oct. 15, 2015

Related U.S. Application Data

(63) Continuation of application No. PCT/JP2014/064134, filed on May 28, 2014.

(30) Foreign Application Priority Data

Nov. 18, 2013 (JP) .................................. 2013-238329

(51) Int. Cl.
   *H04N 5/232* (2006.01)
   *G06K 9/00* (2006.01)
   *G02B 7/28* (2006.01)

(52) U.S. Cl.
   CPC ........... *H04N 5/23219* (2013.01); *G02B 7/28* (2013.01); *G02B 7/287* (2013.01); *G06K 9/00* (2013.01)

(58) Field of Classification Search
   CPC ..... H04N 5/23219; H04N 5/147; G06F 3/013
   See application file for complete search history.

(56) References Cited

U.S. PATENT DOCUMENTS

2010/0074557 A1* 3/2010 Oku ..................... G06K 9/3233
   382/291
2012/0249838 A1* 10/2012 Hiratsuka .......... H04N 5/23216
   348/239

(Continued)

FOREIGN PATENT DOCUMENTS

JP   2006-229322 A   8/2006
JP   2006-254107 A   9/2006

(Continued)

OTHER PUBLICATIONS

Office Action mailed in corresponding Japanese Patent Application No. 2015-525680 on Aug. 18, 2015, consisting of 8 pp. (English translation provided).

(Continued)

*Primary Examiner* — Christopher K Peterson
(74) *Attorney, Agent, or Firm* — Volpe and Koenig, P.C.

(57) ABSTRACT

An imaging apparatus includes an imager, a face detecting unit, an object detecting unit, an another-subject determining unit, a trimming-position setting unit, and an image processing unit. The imager acquires image data. The face detecting unit detects a face in the image data. An object detecting unit detects an object specifying a direction in which the face seems to be paying attention. The another-subject determining unit determines whether another subject is present in the direction in which the face seems to be paying attention. The trimming-position setting unit sets a trimming range on the basis of a determination result of the another-subject determining unit. The image processing unit performs trimming on the image data in accordance with the trimming range set.

2 Claims, 12 Drawing Sheets

(56) References Cited

U.S. PATENT DOCUMENTS

2013/0083176 A1* 4/2013 Kasahara ............... G06T 11/60
                                                                       348/61
2013/0195374 A1* 8/2013 Fukata ................... G06T 11/60
                                                                       382/282

FOREIGN PATENT DOCUMENTS

| JP | 2006-277729 A | 10/2006 |
| --- | --- | --- |
| JP | 2007-158680 A | 6/2007 |
| JP | 2009-218807 A | 9/2009 |
| JP | 2010-103972 A | 5/2010 |
| JP | 2011-087257 A | 4/2011 |
| JP | 2011-135527 A | 7/2011 |
| JP | 2012-217132 A | 11/2012 |

OTHER PUBLICATIONS

International Search Report mailed in corresponding International Patent Application No. PCT/JP2014/064134 on Aug. 12, 2014, consisting of 5 pp. (English translation provided).

International Preliminary Report on Patentability mailed in corresponding International Patent Application No. PCT/JP2014/064134 on May 24, 2016, consisting of 8 pp. (English translation provided).

* cited by examiner

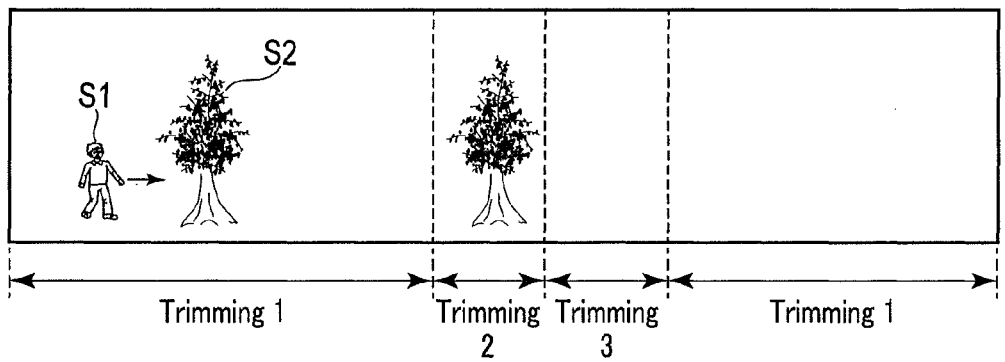
F I G. 11
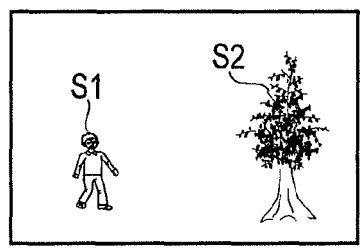
F I G. 12A
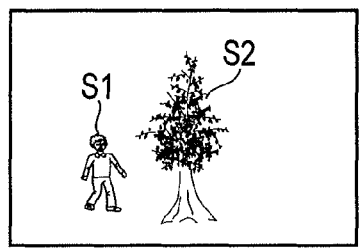
F I G. 12B

IMAGING APPARATUS, IMAGING ASSIST METHOD, AND NON-TRANSITORY RECODING MEDIUM STORING AN IMAGING ASSIST PROGRAM

CROSS-REFERENCE TO RELATED APPLICATIONS

This application is a Continuation Application of PCT Application No. PCT/JP2014/064134, filed May 28, 2014 and based upon and claiming the benefit of priority from the prior Japanese Patent Application No. 2013-238329, filed Nov. 18, 2013, the entire contents of both of which are incorporated herein by reference.

BACKGROUND OF THE INVENTION

1. Field of the Invention

This invention relates to an imaging apparatus, an imaging assist method, and a non-transitory recording medium storing an imaging assist program.

2. Description of the Related Art

In recent years, proposals have been made with regard to imaging apparatuses that have the function of assisting the setting of a composition at the time of capturing an image. An imaging apparatus is proposed in, for example, Jpn. Pat. Appln. KOKAI Publication 2011-135527. This apparatus acquires, as a sample image, at least one part of the image displayed at the live-view display, and evaluates the composition of the sample image. If the composition of the sample image is given a high evaluation, the sample image is shown superimposed on the image displayed at the live-view display.

BRIEF SUMMARY OF THE INVENTION

According to a first aspect of the invention, an imaging apparatus comprises: an imager configured to acquire image data by performing image capturing; a face detecting unit configured to detect a face which is a main imaging subject in the image data; an object detecting unit configured to detect an object specifying a direction in which the face seems to be paying attention to something in the image data; an another-subject determining unit configured to determine, from, the object detected by the object detecting unit, whether another subject is present in the direction in which the face seems to be paying attention; a trimming-position setting unit configured to set a trimming range, thereby to arrange the face and the another subject in a screen if the another-subject determining unit determines that the another subject is present, and to arrange the face in the screen and provide a space in the direction in which the face part seems to be paying attention, if the another-subject determining unit do not determines that the another subject is present; and an image processing unit configured to perform trimming on the image data in accordance with the trimming range set.

According to a second aspect of the invention, an imaging assist method comprises: acquiring image data by performing video capturing at an imager; detecting a face which is a main imaging subject in the image data; detecting an object specifying a direction in which the face part seems to be paying attention to something in the image data; determining, from the object detected, whether another subject is present in the direction in which the face seems to be paying attention; setting a trimming range, thereby to arrange the face and the another subject in a screen if the another subject is present, and to arrange the face in the screen and provide a space in the direction in which the face seems to be paying attention, if the another subject is not present; and performing trimming on the image data in accordance with the trimming range set.

According to a third aspect of the invention, a non-transitory computer-readable recording medium storing an imaging assist program for causing a computer to: acquire image data by performing image capturing at an imager; detect a face which is a main imaging subject in the image data; detect an object specifying a direction in which the face seems to be paying attention to something in the image data; determine, from the object detected, whether another subject is present in the direction in which the face seems to be paying attention; set a trimming range, thereby to arrange the face and the another subject in a screen if the another subject is present, and to arrange the face in the screen and provide a space in the direction in which the face seems to be paying attention, if the another subject is not present; and perform trimming on the image data in accordance with the trimming range set.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 11 is a diagram showing the timing of performing trimming 1, trimming 2, and trimming 3;

FIG. 12A is the first diagram explaining trimming 1;

FIG. 12B is the second diagram explaining trimming 1;

DETAILED DESCRIPTION OF THE INVENTION

Embodiments of this invention will be described with reference to the accompanying drawings.

First Embodiment

Figure 1:
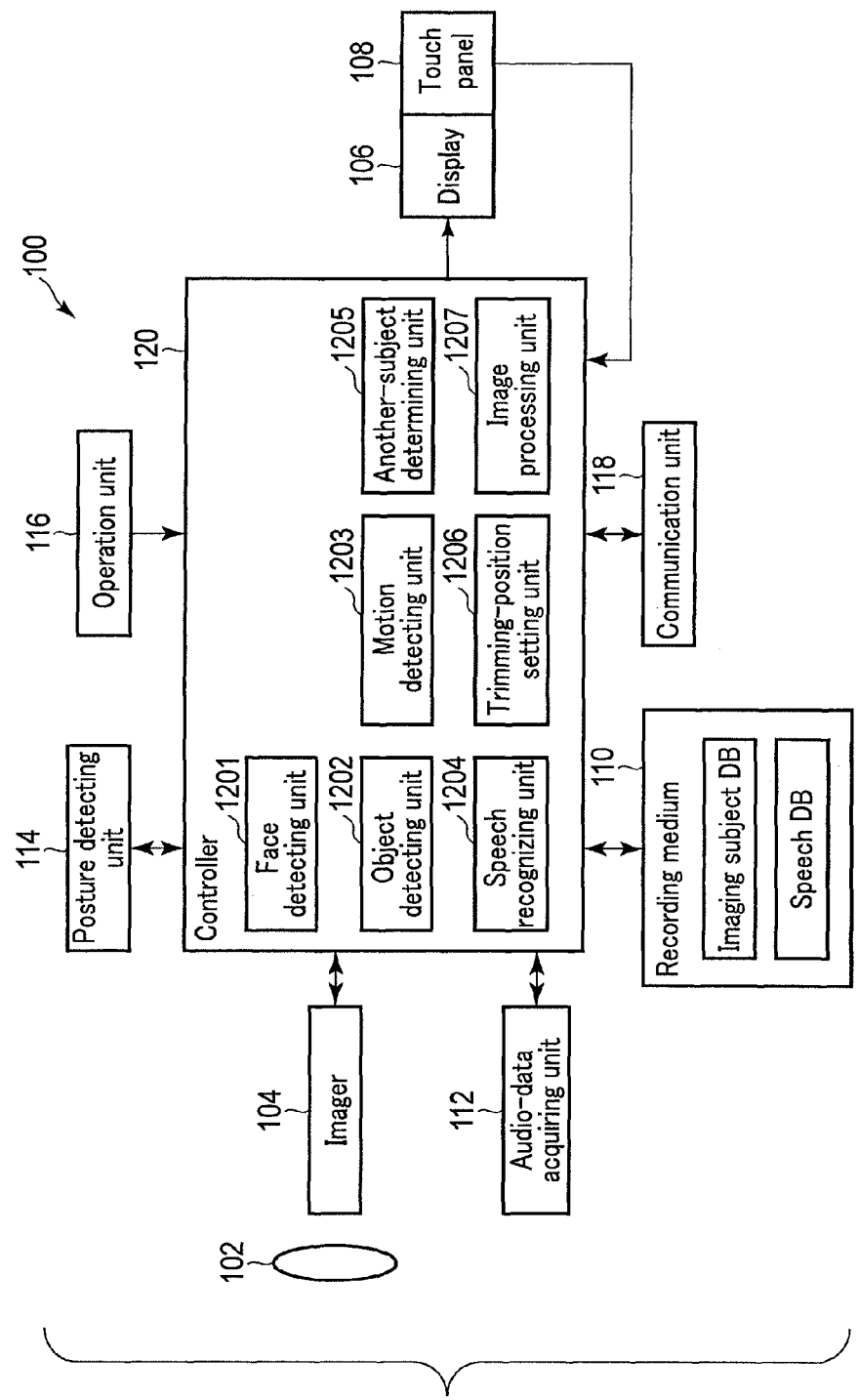
FIG. 1 is a block diagram showing an exemplary configuration of an imaging apparatus according to each embodiment of this invention.

First, the first embodiment of this invention will be described. FIG. 1 is a block diagram showing an exemplary configuration of an imaging apparatus according to each embodiment of this invention. The imaging apparatus 100 shown in FIG. 1 can be applied to various types of mobile terminals such as digital cameras, mobile telephones having a camera function, and smart phones. The imaging apparatus 100 shown in FIG. 1 includes an imaging optical system 102, an imager 104, a display 106, a touch panel 108, a recording medium 110, a speech-data acquiring unit 112, a posture detecting unit 114, an operation unit 116, a communication unit 118, and a controller 120.

The imaging optical system 102 is an optical system configured to apply the light flux coming from an imaging subject (not shown) to the imager 104. The imaging optical system 102 may include a focus lens or may be configured as a zoom lens.

The imager 104 captures the imaging subject and acquires image data about the imaging subject. The imager 104 has an imaging element, an imaging process circuit, and an Analog-to-Digital (hereinafter A-to-D) converting circuit. The imaging element receives light via the imaging optical system 102 and converts the light to an electric signal (image signal) equivalent to the amount of light. The imaging process circuit performs various analog processes, such as gain adjustment, on the image signal acquired in the imaging element. The A-to-D converting circuit converts the image signal analog-processed in the imaging process circuit to image data, i.e., a digital signal.

The display 106 is, for example, a liquid crystal display or an organic EL display, and displays various types of images based on the image data acquired in the imager 104 or the like. The touch panel 108 is provided on the display screen of the display 106, and detects the touch of, for example, the user's fingers on the display screen of the display 106. The information of a touch position detected on the touch panel 108 is input to the controller 120. The controller 120 performs a control in accordance with the touch position detected at the touch panel 108.

The recording medium 110 is, for example, a flash memory, and is a recording medium for recording various data. The recording medium 110 records, for example, an image file acquired as a result of capturing an image. Also, the recording medium 110 records the program that is used to control the imaging apparatus 100. The recording medium 110 has a recording region for an imaging subject database (DB) and a recording region for a speech database (DB). The imaging subject DB is a database storing the data for identifying the imaging subject, which is included in the image data. The data for identifying the subject represents the face or fingers of a person. The speech DB is a database storing the data for identifying the speech input via the speech-data acquiring unit 112. The data identifying the speech is the speech data about each user.

The speech-data acquiring unit 112 acquires speech data based on speech the user has made. The speech-data acquiring unit 112 has a microphone, a speech processing circuit, and an A-to-D converting circuit. The microphone generates an electric signal (speech signal) representing the user's speech input. The speech processing circuit performs various analog processes, such as gain adjustment, on the speech signal the microphone has generated. The A-to-D converting circuit converts the speech signal analog-processed in the speech processing circuit to speech data that is a digital signal.

The posture detecting unit 114 detects the posture of the subject from the data recorded in the imaging subject DB and identifies the subject. If the subject identified in the image data takes a specific posture, the posture detecting unit 114 informs the controller 120 of this fact.

The operation unit 116 is a component the user may instruct to operate the imaging apparatus 100. The operation unit 116 has operation members such as a power switch and a release button. The power switch is an operation member for turning on or off the power supply of the imaging apparatus 100. The release button is an operation member for giving an imaging-start instruction.

The communication unit 118 is, for example, a wireless interface, and performs data communication, such as 3G communication, between the imaging apparatus 100 and an external apparatus.

The controller 120 includes a CPU and memory, and controls the overall operation of the imaging apparatus 100. The controller 120 has a face detecting unit 1201, an object detecting unit 1202, a motion detecting unit 1203, a speech recognizing unit 1204, an another-subject determining unit 1205, an trimming-position setting unit 1206, and an image processing unit 1207. The face detecting unit 1201 uses the information stored in the imaging subject DB of the recording medium 110, detecting the face of the main imaging subject in the image data. The object detecting unit 1202 uses the information stored in the imaging subject DB of the recording medium 110, detecting objects such as the eyes or fingers of the imaging subject that specify the direction in which the imaging subject seems to be paying attention something. The motion detecting unit 1203 detects the motion of the imaging subject (e.g., face) per unit of time (i.e., moving speed) from the image data for a plurality of frames. The speech recognizing unit 1204 uses the information stored in the speech DB of the recording medium 110, recognizing the content of the speech data acquired in the speech-data acquiring unit 112. The another-subject determining unit 1205 uses the outputs of the face detecting unit 1201, object detecting unit 1202, motion detecting unit 1203, and speech recognizing unit 1204 in determining whether another imaging subject is present in the direction in which the imaging subject seems to be paying attention. The trimming-position setting unit 1206 sets the position at which to extract data from the image data acquired in the imager 104, in accordance with the outputs of the face detecting unit 1201, object detecting unit 1202, motion detecting unit 1203, speech recognizing unit 1204 and another-subject determining unit 1205. The image processing unit 1207 performs various image processes on the image data acquired in the imager 104. These image processes include the processes indispensable for displaying or recording the image data, such as white-balance correction, gradation correction, and color correction. In this embodiment, the image processes include trimming of the image data and enlarging the image data trimmed.

Figure 2:
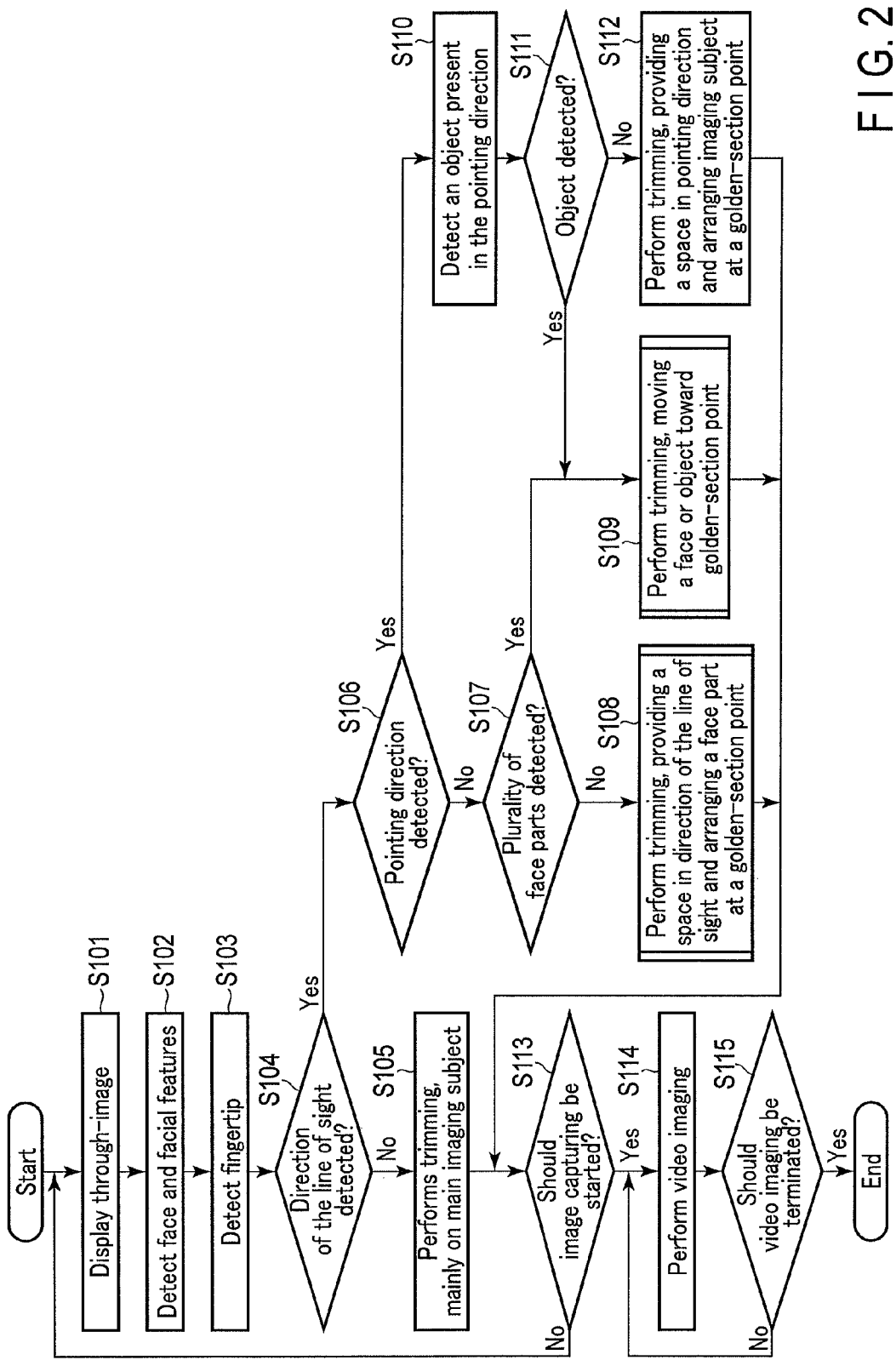
FIG. 2 is a flowchart showing the process that the imaging apparatus according to the first embodiment of this invention performs in the imaging operation.

Next, the operation of the imaging apparatus 100 according to this embodiment will be explained. In this embodiment, if the user points to any desired imaging subject, an image composition is automatically set so as to arrange the other imaging subject at a specific position on the screen. The processes the imaging apparatus 100 performs, including the setting of the image composition, will be explained. FIG. 2 is a flowchart showing the process that the imaging apparatus 100 according to the first embodiment performs in the imaging operation. The process of FIG. 2 is controlled mainly by the controller 120. FIG. 2 exemplifies the operation performed in capturing a video image. The technique of this embodiment can be applied in taking still images.

For example, when the imaging apparatus 100 is turned on and its image capturing mode is set to the video capture mode, the process of FIG. 2 is started. At this point, the controller 120 starts the display of a through-image (Step S101). In displaying the through-image, the controller 120 continuously operates the imager 104, which generates image data. The image processing unit 1207 processes the image data in order to display the image. Then, the controller 120 causes the display 106 to display the through-image on the basis of the image data so processed. From the through-image displayed by the display 106, the user can confirm the image composition.

After the start of displaying the through-image, the face detecting unit 1201 of the controller 120 detects the face of the image data acquired by the imager 104. The face detecting unit 1201 of the controller 120 then detects the facial parts represented by the image data acquired by the imager 104 (Step S102). The face in the image data is detected by, for example, matching the image data acquired by the imager 104 with the face-pattern image data stored in the imaging subject DB. The facial parts are similarly detected by using a known method such as pattern matching. In this embodiment, at least the eyes are detected as facial parts.

Then, the object detecting unit 1202 of the controller 120 detects a fingertip included in the image data acquired by the imager 104 (Step S103). The fingertip included in the image data is also detected by matching the image data acquired by the imager 104 with the image data stored in the imaging subject DB and representing the fingertip pattern.

Next, the another-subject determining unit 1205 of the controller 120 determines whether the direction of a line of sight has been detected or not (Step S104). The direction in which the line of sight extends can be determined by detecting, for example, the motion of the pupils. That is, if the motion of the centers of the pupils is detected in the image data, the direction in which the centers of the pupils have moved can be regarded as the direction of the line of sight.

If it is found in Step S104 that the direction of the line of sight has not been detected (or if the face part cannot be detected), the trimming-position setting unit 1206 sets a trimming range, arranging the main imaging subject at the center of the screen. Then, the image processing unit 1207 performs trimming on the image data in accordance with the trimming range so set (Step S105). The main imaging subject is, for example, the imaging subject at the center of the screen, the nearest imaging subject, or person, or the like. The angle of view, for example, may be too small to arrange the main imaging subject at the center of the screen. In this case, the focal distance of the imaging optical system 102 may be shortened to increase the angle of view. Thus, the image composition is set by using the main imaging subject as a reference if the direction of the line of sight cannot be detected. If the main imaging subject cannot be arranged at the center of the screen, the trimming may not be performed.

Figure 3:
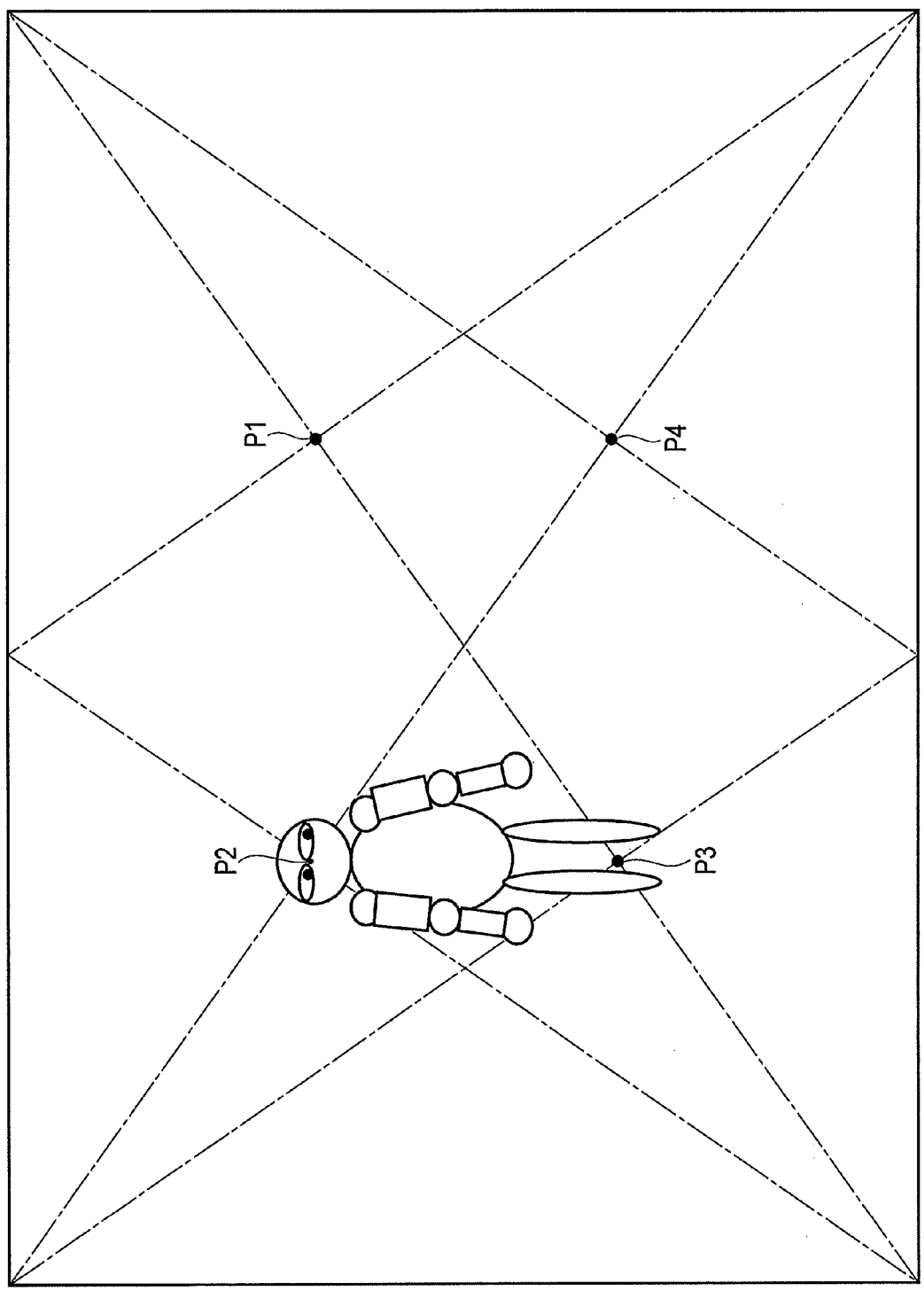
FIG. 3 is a diagram explaining the first example of composition setting performed by the trimming-position setting unit.

If it is found in Step S104 that the direction of the line of sight has been detected, the another-subject determining unit 1205 determines whether the pointing direction has been detected or not (Step S106). If the pointing direction is found to have not been detected in Step S106, the another-subject determining unit 1205 determines whether a plurality of faces have been detected from the image data (Step S107). In Step S107 it may be determined that a plurality of faces have not been detected from the image data. In this case, the trimming-position setting unit 1206 sets a trimming range, providing a space in the same direction as the direction of the line of sight, and arranging the face of the main imaging subject at any one of golden-section points in the direction opposite to the direction of the line of sight, shown as FIG. 3. Thereafter, the image processing unit 1207 trims the image data in accordance with the trimming range set (Step S108). Each golden-section point is the intersection of a diagonal drawn in the screen and the perpendicular drawn from an apex other than the apex on the diagonal. Four golden-section points P1, P2, P3, and P4 are shown in FIG. 3. The process performed in Step S108 will be explained in detail, with reference to FIG. 4a and FIG. 4b. Before explaining the process with reference to FIG. 4a and FIG. 4b, the direction of the line of sight will be defined. That is, the direction of the line of sight is represented as, for example, the angle between the line of sight and the vertical line of the screen. Anticlockwise direction is a positive direction of the line of sight.

Figure 4A:
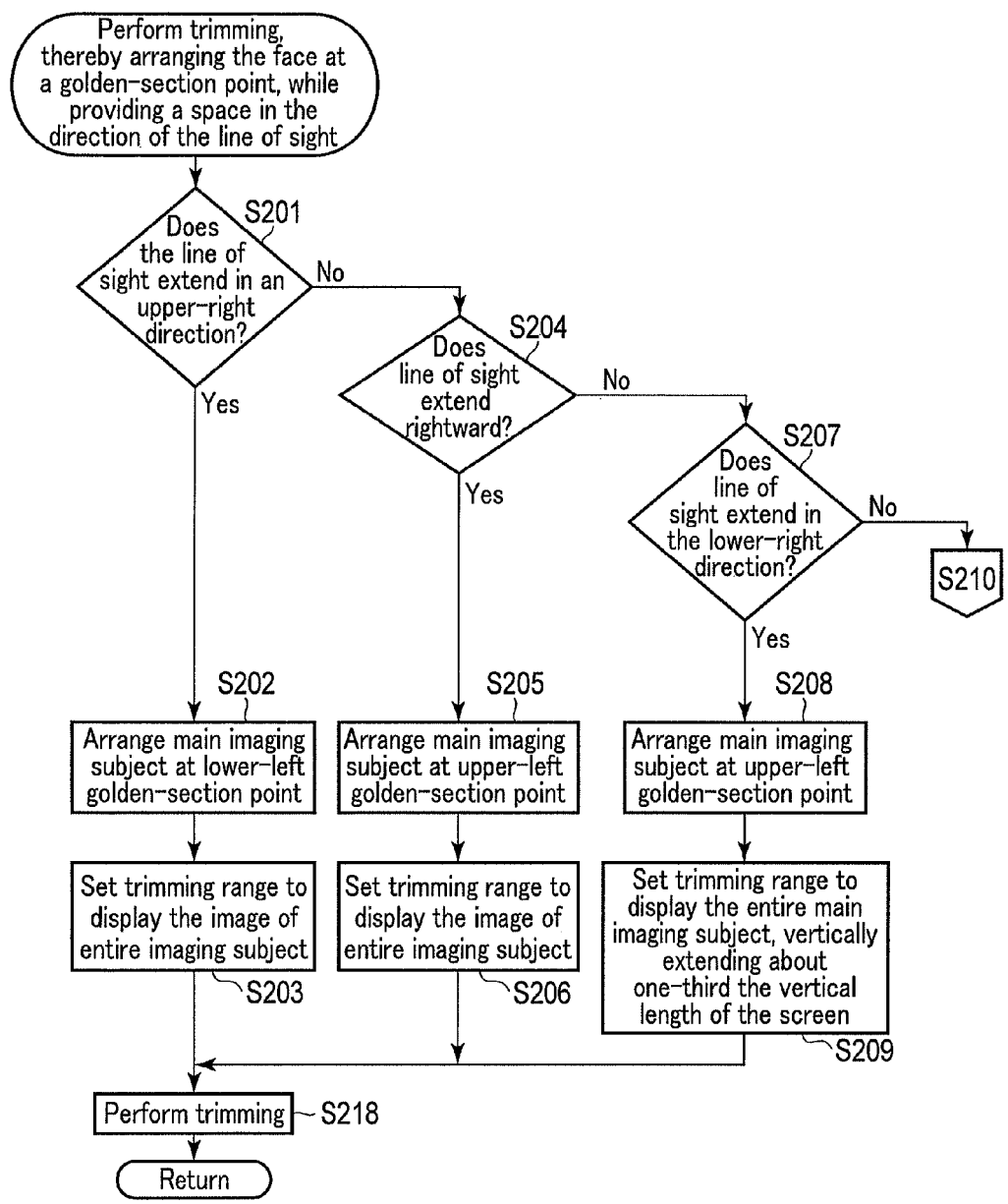
FIG. 4a is the first flowchart explaining the process performed in Step S108 shown in FIG. 2.
Figure 4B:
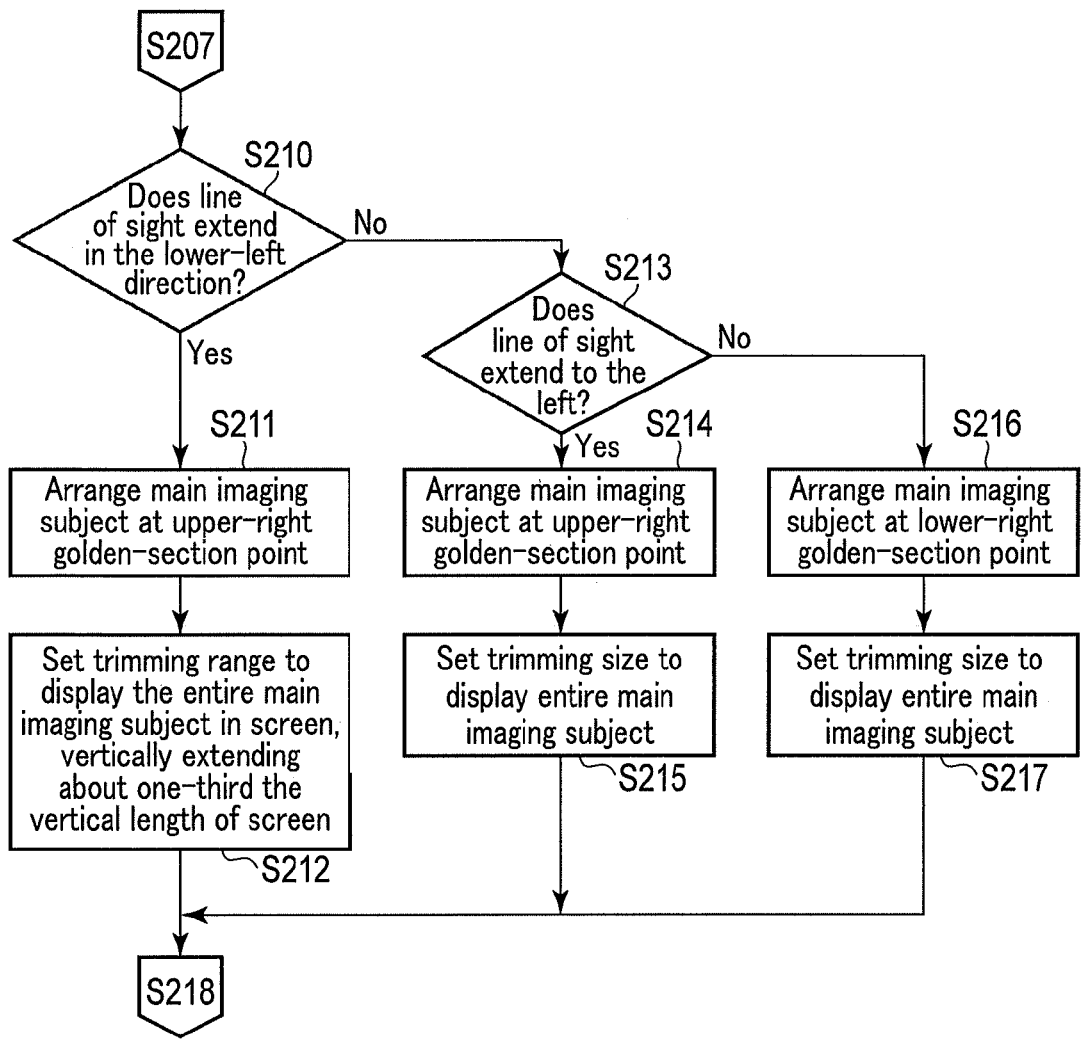
FIG. 4b is the second flowchart explaining the process performed in Step S108 shown in FIG. 2.

As shown in FIG. 4a and FIG. 4b, the trimming-position setting unit 1206 determines whether or not the line of sight extends in an upper-right direction (Step S201). The upper-right direction falls in, for example, a range of 0° to 74°. In Step S201, the line of sight may be determined to extend in an upper-right direction. In this case, the trimming-position setting unit 1206 sets a trimming range, arranging the face (or any other part) of the main imaging subject at the lower-left golden-section point (i.e., point P3 shown in FIG. 3) (Step S202). The trimming-position setting unit 1206 then sets such a final trimming range that the image of the entire imaging subject may be displayed in the screen (Step S203). The direction of the line of sight which is upper-right direction means that the main imaging subject is paying attention to something displayed in the upper-right part of the screen. Therefore, an image composition is set, in which the main imaging subject may be arranged at the lower-left part of the screen, thereby providing a space in the upper-right part of the screen. A video image emphasizing the line of sight of the main imaging subject can, therefore, be taken.

In Step S201, in case the line of sight is determined to not extend in the upper-right direction, the trimming-position setting unit 1206 determines whether or not the line of sight extends rightward (Step S204). The rightward direction falls in, for example, a range of 75° to 104°. In Step S204, in case the direction of the line of sight is found to be rightward, the trimming-position setting unit 1206 sets a trimming range, arranging the face of the main imaging subject at the upper-left golden-section point (i.e., point P2 shown in FIG. 3) (Step S205). Thereafter, the trimming-position setting unit 1206 sets the final trimming range to display the entire main imaging subject in the screen (Step S206). The direction of the line of sight which is the rightward direction means that the main imaging subject is paying attention to something displayed in the right part of the screen. Therefore, an image composition is set, in which the main imaging subject is arranged at the left part of the screen (since the face part is arranged at the upper-left golden-section point) and a space is provided in the right part of the screen. As a result, a video image emphasizing the line of sight of the main imaging subject can be taken.

In Step S204, in case the direction of the line of sight is found to not be rightward, the trimming-position setting unit 1206 determines whether the line of sight extends in a lower-right direction (Step S207). The lower-right direction falls in, for example, a range of 105° to 179°. In Step S207, in case the direction of the line of sight is found to be the lower-right direction, the trimming-position setting unit 1206 sets a trimming range, arranging the face part of the main imaging subject at the upper-left golden-section point (i.e., point P2 shown in FIG. 3) (Step S208). Thereafter, the trimming-position setting unit 1206 sets the final trimming range to display the entire main imaging subject in the screen, vertically extending about one-third the vertical length of the screen (Step S209). The direction of the line of sight which is a lower-right direction means that the main imaging subject is paying attention to something displayed in the lower-right part of the screen. Thus, an image composition can be set in which the main imaging subject is arranged in the upper-left part of the screen and a space is provided in the lower-right part of the screen, thereby enabling taking a video image emphasizing the line of sight of the main imaging subject. If the face is arranged at the upper-left golden-section point as described in conjunction with Step S206, the main imaging subject will be arranged, in its entirety, at the left part of the screen. Accordingly, in Step S209, the final composition is set in which the imaging subject vertically extends about one-third the vertical length of the screen. As a result, a space is provided in the lower-right part of the screen. The one-third size is an example.

In Step S207, in case the line of sight is determined to not extend in the lower-right direction, the trimming-position setting unit 1206 determines whether or not the line of sight extends in the lower-left direction (Step S210). The lower-left direction falls in, for example, a range of 180° to 254°. In Step S210, in case the line of sight is found to extend in the lower-left direction, the trimming-position setting unit 1206 sets a trimming range, arranging the face of the main imaging subject at the upper-right golden-section point (i.e., point P1 shown in FIG. 3) (Step S211). Thereafter, the trimming-position setting unit 1206 sets the final trimming range to display the entire main imaging subject in the screen, vertically extending about one-third the vertical length of the screen (Step S212). The direction of the line of sight which is the lower-left direction means that the main imaging subject is paying attention to something displayed in the lower-left part of the screen. Thus, an image composition can be set in which the main imaging subject is arranged in the upper-right part of the screen and a space is provided in the lower-left part of the screen. A video image can therefore be taken which emphasizes the line of sight of the main imaging subject.

In Step S210, in case the line of sight is determined to not extend in the lower-left direction, the trimming-position setting unit 1206 determines whether or not the line of sight extends to the leftward (Step S213). The leftward direction falls in, for example, a range of 255° to 284°. In Step S213, in case the line of sight is found to extend to the leftward, the trimming-position setting unit 1206 sets a trimming range, arranging the face of the main imaging subject at the upper-right golden-section point (i.e., point P1 shown in FIG. 3) (Step S214). Thereafter, the trimming-position setting unit 1206 sets the final trimming range to display the entire main imaging subject in the screen (Step S215). The direction of the line of sight which is a leftward direction means that the main imaging subject is paying attention to something displayed in the left part of the screen. An image composition can therefore beset in which the main imaging subject is arranged in the right part of the screen and a space is provided in the left part of the screen. A video image emphasizing the line of sight of the main imaging subject can, therefore, be taken.

In Step S213, in case the line of sight is determined to not extend to the leftward, but to extend in the upper-left direction (e.g., in range of 285° to 359°), the trimming-position setting unit 1206 sets a trimming range, arranging the face of the main imaging subject at the lower-right golden-section point (i.e., point P4 shown in FIG. 3) (Step S216). Thereafter, the trimming-position setting unit 1206 sets the final trimming range to display the entire main imaging subject in the screen (Step S217). The direction of the line of sight which is an upper-left direction means that the main imaging subject is paying attention to something displayed in the upper-left part of the screen. An image composition can therefore be set in which the main imaging subject is arranged in the lower-right part of the screen and a space is provided in the upper-left part of the screen. A video image emphasizing the line of sight of the main imaging subject can, therefore, be taken.

After the trimming range has been set, the image processing unit 1207 trims the image data in accordance with the trimming range that was set (Step S218). Thereafter, the controller 120 terminates the process of FIG. 4a and FIG. 4b. In Step S108, the trimming is performed, arranging the main imaging subject at that part of the screen which opposes another part in the direction of the line of sight of the main imaging subject. A video image emphasizing the line of sight of the main imaging subject can thereby be taken.

Figure 5:
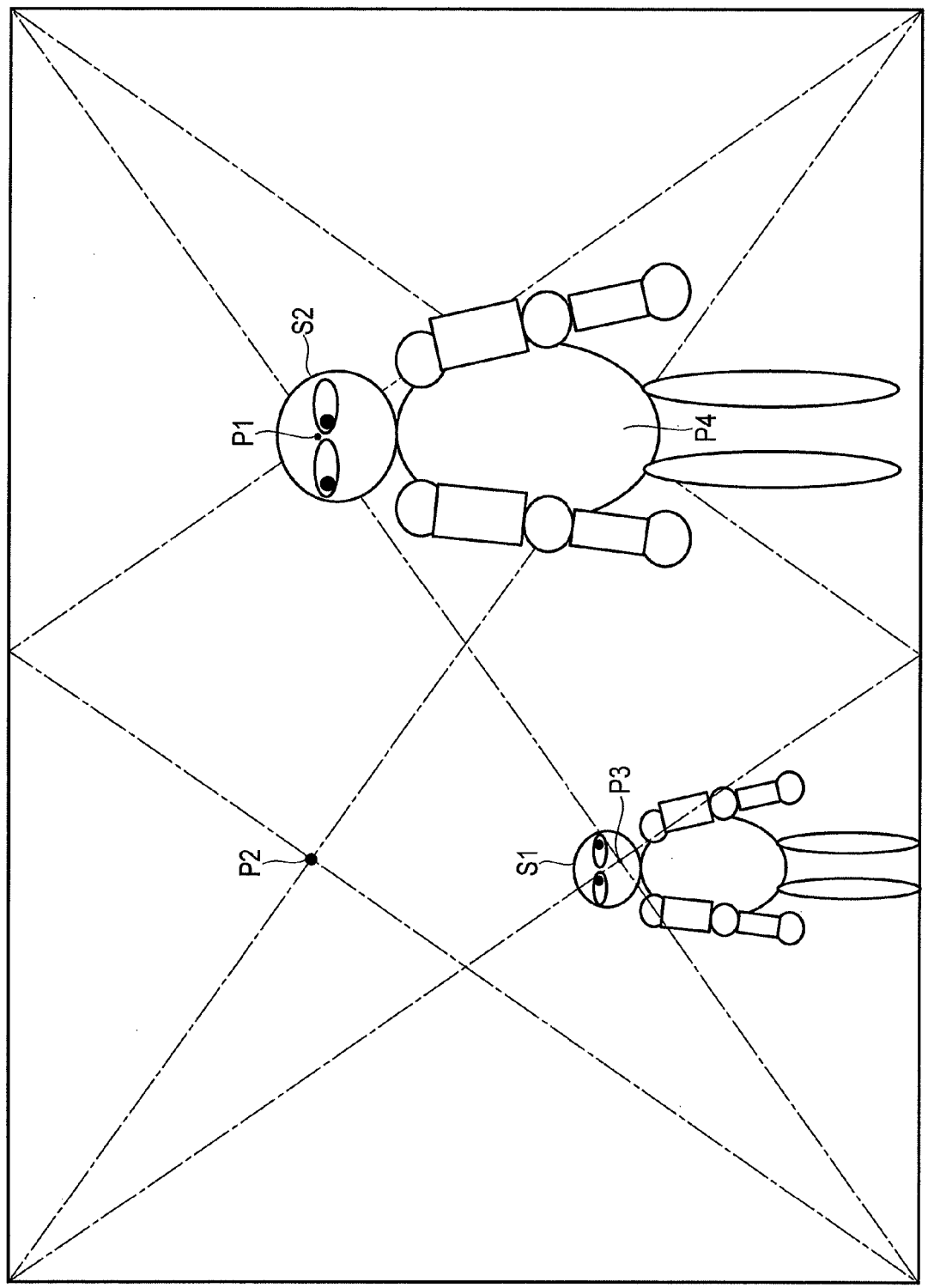
FIG. 5 is a diagram explaining the second example of composition setting performed by the trimming-position setting unit.

Referring back to FIG. 2, the process will be further explained. In Step S107 in case it is detected that face parts have been detected from the image data, the trimming-position setting unit 1206 sets a trimming range so that the faces may be arranged near the golden-section points, respectively, as shown in FIG. 5. Then, the image processing unit 1207 trims the image data in accordance with the trimming range so set (Step S109). The process performed in Step S109 will be described in detail, with reference to FIG. 6.

Figure 6:
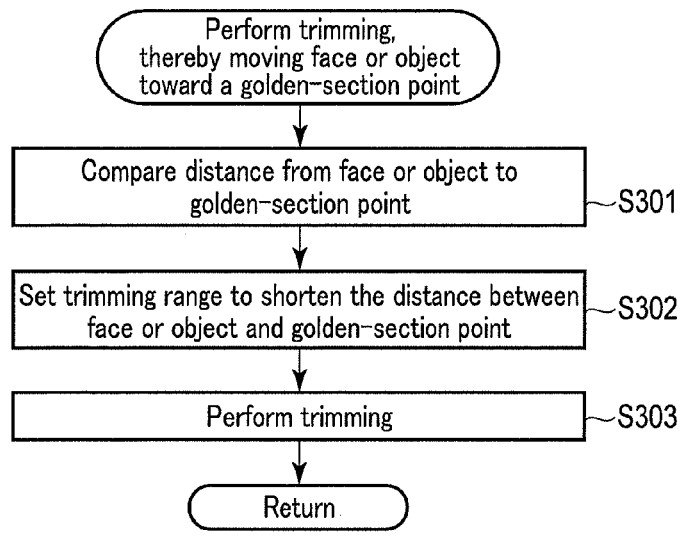
FIG. 6 is a flowchart explaining the process performed in Step S109 shown in FIG. 2.

As shown in FIG. 6, the trimming-position setting unit 1206 first compares the distances from the position of each face (e.g., coordinates of the center of the face) to the respective golden-section points (Step S301). The trimming-position setting unit 1206 then sets such a trimming range, shortening the distances between each face and the golden-section points (Step S302). In the case of FIG. 5, the trimming range is set, arranging the faces of imaging subjects S1 and S2 at the golden-section points P3 and P1, respectively. A trimming range may be set, arranging the faces of imaging subjects near one golden-section point. In this embodiment, however, such a trimming range is not set as final trimming range.

After the trimming range is set, the image processing unit 1207 trims the image data in accordance with the trimming range that was set (Step S303). Thereafter, the controller 120 terminates the process of FIG. 6. If the image data is trimmed as in Step S109, a video image can be taken which emphasizes the face of another person the main imaging subject seems to be paying attention. If the trimming is performed in Step S109 every time faces are detected, the image composition may include the face of another person having absolutely no connection to others in the image. In view of this, the apparatus may be modified to not perform the trimming in Step S109 if the image composition includes any face not registered or if the imaging subjects do not look at each other.

Figure 7:
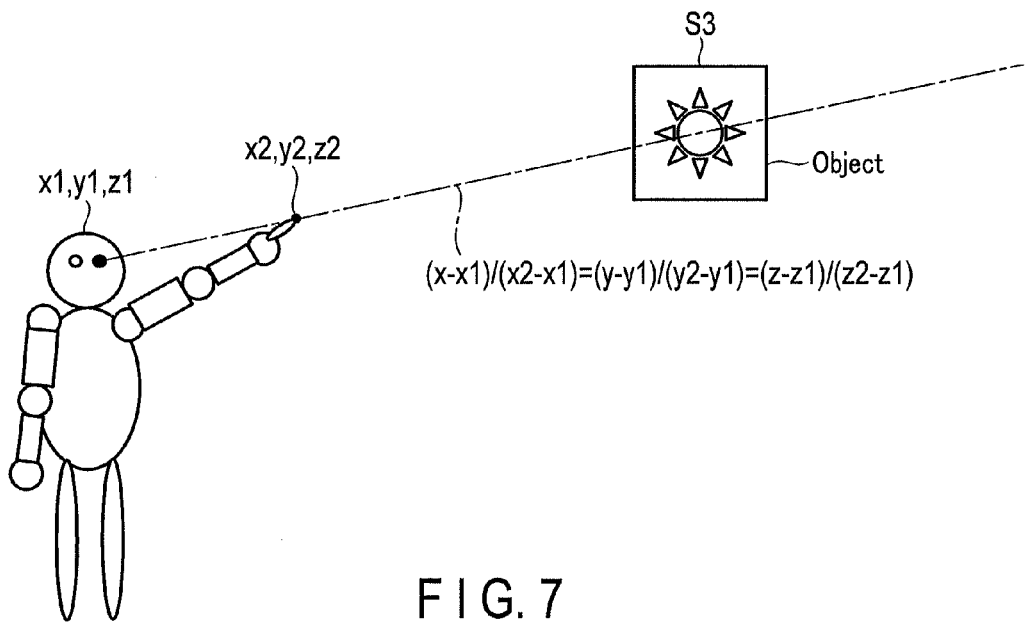
FIG. 7 is a diagram explaining the process of detecting an object from the pointing direction.

Referring back to FIG. 2 again, the process will be further explained. In case the pointing direction is found to have been detected in Step S106, the another-subject determining unit 1205 of the controller 120 detects, from the pointing direction (Step S110), an object that the main imaging subject seems to be paying attention. As shown in FIG. 7, an object S3 that is present in a line (one-dot, dashed line) extending from the eye position (x1, y1, z1) of the imaging subject and passing the fingertip position (x2, y2, z2) thereof is detected in this process. The object S3 is detected by using a known method such as characteristic matching or contour extraction. In the case of FIG. 7, the eye position and the fingertip position have three-dimensional information. The information of depth z is acquired as object-distance information. If the object-distance information cannot be obtained, the object S3 may be detected from the two-dimensional information acquired from the image data. The object present in the line extending from the eye position and passing the fingertip position is pointed to by the main imaging subject. That is, the main imaging subject seems to be paying attention to this object.

Figure 8:
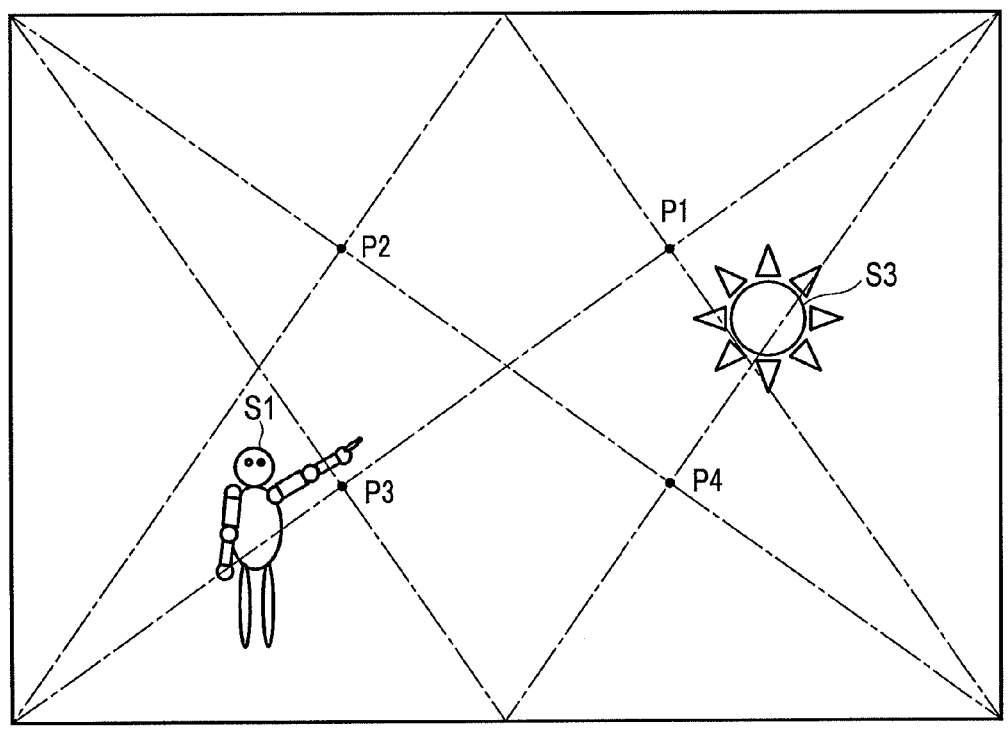
FIG. 8 is a diagram explaining the third example of composition setting performed by the trimming-position setting unit.

After the object has been detected, the another-subject determining unit 1205 determines whether or not the object has been detected (Step S111). In Step S111, in case the object is found to have been detected, the process goes to Step S109. In Step S109 described above, a trimming range is set, arranging the faces near the golden-section points, respectively. If the process branches from Step S111 to Step S109, a trimming range is set, arranging the face of the main imaging subject and the object detected in Step S110 near two golden-section points, respectively, shown in FIG. 8. This process is similar to the process of FIG. 6. The trimming performed in Step S109 enables the apparatus 100 to take a video image that emphasizes the object that the main imaging subject seems to be paying attention.

In Step S111, in case the object is found to have not been detected, the trimming-position setting unit 1206 sets a trimming range, providing a space in the pointing direction, and arranging the face of the main imaging subject at a golden-section point. Then, the image processing unit 1207 performs trimming on the image data in accordance with the trimming range so set (Step S112). The process of Step S111 is performed in the same way as the process of Step S108, though the pointing direction is used in place of the direction of the line of sight.

After the trimming has been performed, the controller 120 determines whether or not the user has instructed the capturing of a video image (Step S113). The capturing of a video image is started when the release button, for example, is pushed. In Step S113, incase it is determined that the user has instructed that a moving-picture should be photographed, the controller 120 performs video capturing (Step S114). That is, the controller 120 causes the imager 104 to perform its function and the image processing unit 1207 processes the image data, generating video image data. A moving-picture file is generated from the video image data, and is recorded in the recording medium 110.

After performing the video capturing, the controller 120 determines whether or not the user has instructed that the video capturing should be terminated (Step S115). To terminate the video capturing, the user pushes again, for example, the release button. In Step S115, in case the controller 120 determines that the video capturing should not be terminated, the controller 120 returns the process to Step S114, and the video capturing continues. As the video capturing continues, the controller 120 writes the video data in the video file already recorded. In Step S115, the controller 120 may determine that the video capturing should be terminated. In this case, the controller 120 terminates the video capturing.

As described above, an image composition is set in this embodiment, in accordance with the direction of the line of sight of the imaging subject or the pointing direction. The embodiment can therefore take a video image emphasizing the direction in which the imaging subject seems to be paying attention, i.e., the direction in which the imaging subject seems to be interesting or the imaging subject which the imaging subject seems to be interesting.

FIG. 2 shows the case where the trimming range is not changed during the video capturing. Nonetheless, various types of trimming explained with reference to FIG. 2 may be performed during the video capturing. As described above, the image composition is set, arranging the imaging subjects at golden-section points. For example, the imaging subjects may be arranged at trisection points. Also, the imaging subjects need not be arranged exactly at golden-section points or trisection points that indicate specific positions in the screen.

Second Embodiment

Figure 9A:
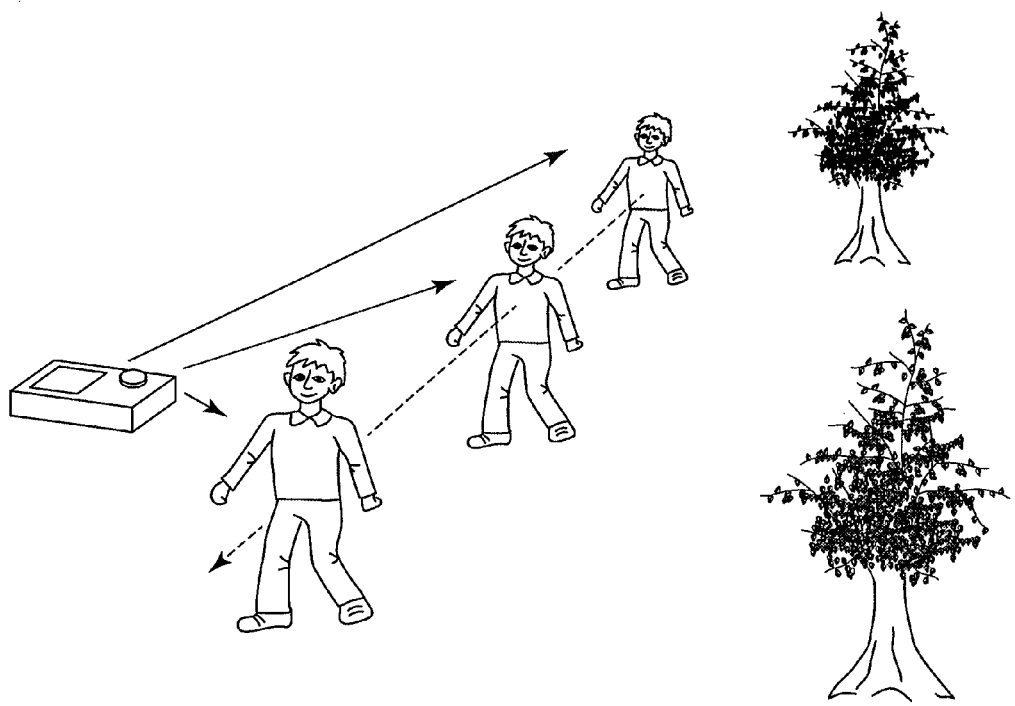
FIG. 9A is the first diagram showing an exemplary image acquired by the imaging optical system used in the second embodiment of this invention.
Figure 9B:
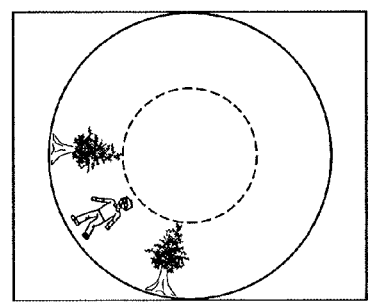
FIG. 9B is the second diagram showing an exemplary image acquired by the imaging optical system used in the second embodiment of this invention.

The second embodiment of this invention will be described. The basic configuration of an imaging apparatus 100 according to the second embodiment is the imaging apparatus 100 shown in FIG. 1. In the second embodiment, however, it is desirable for the imaging optical system 102 to have, for example, a fish-eye lens and should therefore be an optical system able to perform ultra-wide angle image capturing. By having this kind of an ultra-wide angle optical element, the imaging optical system 102 can take a video image that ordinary imaging optical systems cannot. For example, as shown in FIG. 9A, the user positions the imaging apparatus 100 with the optical axis of the imaging optical system 102 extending perpendicular to the ground, or with the lens directed to the sky above, and then walks by the imaging apparatus 100. Then, the imaging apparatus 100 of the second embodiment acquires image data representing an annular image such as shown in FIG. 9B, which encircles the optical axis of the optical system 102. Accordingly, a video image showing the walking user is recorded, but the imaging apparatus 100 is not moved to keep scanning the walking user. Furthermore, a video image emphasizing the user's motion can be taken if a trimming range is set in accordance with the motion of the user.

Figure 10:
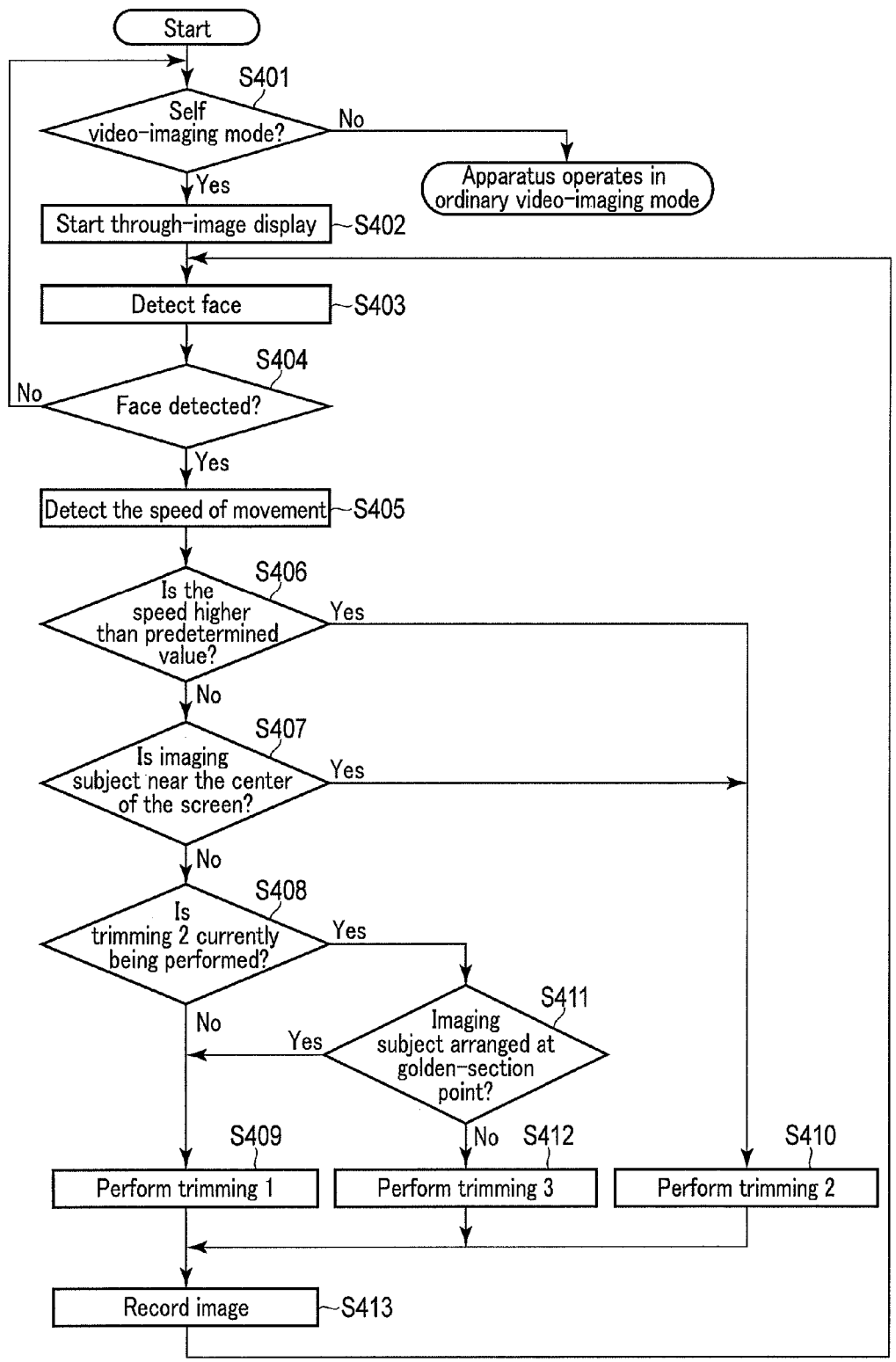
FIG. 10 is a flowchart showing the process that the imaging apparatus according to the second embodiment of this invention performs in the imaging operation.

FIG. 10 is a flowchart showing the process that the imaging apparatus 100 according to the second embodiment performs in the imaging operation. The process of FIG. 10 can be controlled by mainly the controller 120, too.

The process of FIG. 10 is started when the power switch of the imaging apparatus 100 is turned on and the imaging apparatus 100 is set to the video capturing mode. At this time, the controller 120 determines whether the video capturing mode is a self-video capturing mode or not (Step S401). The imaging apparatus 100 according to this embodiment has at least two video capturing modes, i.e., ordinary video capturing mode and self-video capturing mode. The user selects the ordinary video capturing mode, in order to capture an object while holding the imaging apparatus 100 according to the second embodiment, with the optical axis of the optical system 102 extending parallel to the ground, or with the lens directed at the object. In the ordinary video capturing mode, the imaging apparatus 100 can acquire image data representing a rectangular picture, not an annular image such as shown in FIG. 9B, if a trimming range has been set. In the self-video capturing mode, the imaging apparatus 100 performs image capturing, with the optical axis of the imaging optical system 102 extending perpendicular to the ground or with the lens directed to the sky above. Note that the user selects and sets the image capturing mode.

In Step 401, in case the operating mode is found to not be the self-video capturing mode, the controller 120 operates in the ordinary video capturing mode. The operation performed in the ordinary video capturing mode is, for example, the operation of FIG. 2. In Step S401, in case it is determined to be in the self-video capturing mode, the controller 120 starts through-image displaying (Step S402). In the controller 120, the face detecting unit 1201 detects the face in the image represented by the image data acquired by the imager 104 (Step S403). Then, the trimming-position setting unit 1206 of the controller 120 determines whether or not the face has been detected in the image data, or whether or not the image of the user is displayed in the screen (Step S404). In Step S404, it may be determined whether or not the face of a specific person has been detected. If the face is not detected in Step S404, the controller 120 returns the process to Step S401.

If the face is detected in Step S404, the trimming-position setting unit 1206 causes the motion detecting unit 1203 to detect the speed of the imaging subject (i.e., face) moving in the horizontal direction on the screen (Step S405). The speed is the number of pixels per unit of time (e.g., one frame), arranged in the horizontal direction in the image data. In Step S405, the speed of the imaging subject moving in the horizontal direction is detected. This is based on the assumption that the imaging subject moves parallel to the ground. If the imaging subject is not a person, it may not move parallel to the ground. In this case, the speed at which the imaging subject moves in a vertical direction may be detected, too. After the speed of the imaging subject has been detected, the trimming-position setting unit 1206 determines whether the speed is higher than a predetermined speed (Step S406). If the speed is determined to be lower than the predetermined speed, the trimming-position setting unit 1206 determines whether or not the imaging subject is present near the center of the screen (Step S407). Steps S406 and S407 are performed in order to determine whether trimming 2 has been started or ended. As will be explained later in detail, the trimming 2 is performed if the imaging subject moves at high speed and is present near the center of the screen. Thus, the trimming 2 is performed in a trimming range where the imaging subject is present in the center of the screen.

In Step S407, in case it is determined that the imaging subject is not present near the center of the screen, the trimming-position setting unit 1206 determines whether or not the trimming. 2 is currently being performed (Step S408). If the trimming 2 is not currently being performed, the trimming-position setting unit 1206 sets a trimming range, providing a space in the same direction as the moving direction of the imaging subject and arranging the face of the imaging subject at a golden-section point present on the side opposite with respect to the moving direction of the imaging subject. Thereafter, the image processing unit 1207 performs trimming 1, trimming the image data in accordance with the trimming range thus set (Step S409). In the trimming 1, the trimming range which has been set is maintained until trimming 2 is started. As the actual process of trimming 1, the process shown in FIG. 4a and FIG. 4b is utilized. That is, if the imaging subject moves to the right on the screen, the process is performed on the assumption that the line of sight extends to the right, and if the imaging subject moves to the left on the screen, the process is performed on the assumption that the line of sight extends to the left. Furthermore, the trimming range may be set in accordance with not only the direction in which the line of sight extends, but also the pointing direction. The trimming 1 is performed if the imaging subject moves slowly and has not reached the center of the screen, as is shown in FIG. 11. That is, the trimming 1 is performed in the period of trimming 1, which is illustrated in FIG. 11. In this case, an image composition is set, providing a space on the side toward which the imaging subject is moving. As a result, it is possible to take a video image emphasizing the imaging subject moving in a scenery as shown in FIG. 12A and FIG. 12B. Note that the picture of FIG. 12B has been taken after the picture of FIG. 12A.

Figure 13A:
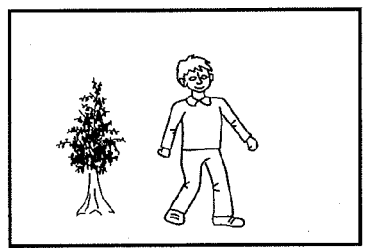
FIG. 13A is the first diagram explaining trimming 2.
Figure 13B:
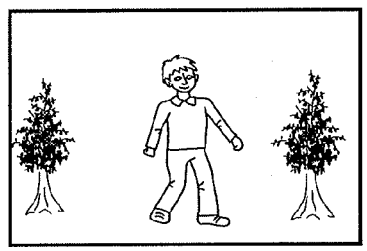
FIG. 13B is the second diagram explaining trimming 2.
Figure 13C:
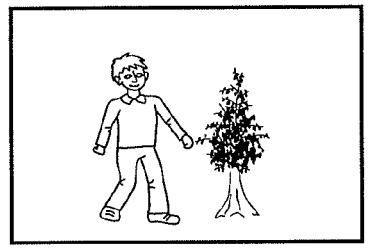
FIG. 13C is the third diagram explaining trimming 2.

In Step S406, in case the speed is determined to be higher than the predetermined speed, if the imaging subject in Step S407 is determined to be present near the center of the screen, the trimming-position setting unit 1206 sets a trimming range predetermined by using the imaging subject (i.e., face) as the center. Thereafter, the image processing unit 1207 performs trimming 2, trimming the image data in accordance with the trimming range thus set (Step S410). If the imaging subject moves obliquely, for example, across the imaging apparatus 100 and comes near the center of the screen (present in the trimming range 2 of FIG. 11), it is close to the imaging apparatus 100. At this point, the moving speed detected in Step S405 from the image data increases. In this case, such trimming ranges as shown in FIG. 13A, FIG. 13B, and FIG. 13C are sequentially set as the imaging subject moves. Thus, a video image is taken, showing the moving imaging subject at the center of the screen as desired.

In Step S408, in case it is determined that the trimming 2 is currently being performed, the trimming-position setting unit 1206 determines whether or not the imaging subject is arranged at a golden-section point (Step S411). Step S411 is performed in order to determine whether trimming 3 has been started or terminated. As will be described later in detail, the trimming 3 is performed to switch from trimming 2 to trimming 1, and performed to sequentially change the trimming range so that the imaging subject may be arranged at a golden-section point.

Figure 14:
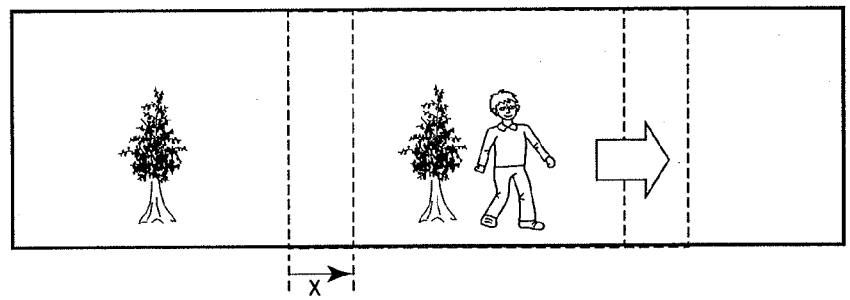
FIG. 14 is a diagram explaining trimming 3.

In Step S411, in case it is determined that the imaging subject is not arranged at a golden-section point, the trimming-position setting unit 1206 sets a trimming range by a predetermined value in the moving direction of the imaging subject. Thereafter, the image processing unit 1207 trims the image data in accordance with the trimming range so set (Step S412). The trimming range is changed by value x per unit of time (e.g., one frame), and the value x shown in FIG. 14 is greater than the moving speed of the imaging subject. Since the value x is greater than the moving speed of the imaging subject, the imaging subject moves in the screen toward the golden-section point present on the side opposite with respect to the moving direction. Finally, the imaging subject is arranged at the golden-section point, as in the trimming 1. Therefore, because a time period, during which the trimming range is sequentially changed, is provided for switching from the trimming 2 to the trimming 1, the trimming can be switched smoothly from the trimming 2 to the trimming 1. Note that the time period is also provided for switching from the trimming 1 to the trimming 2.

In Step S411, the imaging subject may be found arranged at a golden-section point. In this case, the trimming-position setting unit 1206 goes to Step S409. In Step S409, the trimming 1 is performed. As the trimming 2 is switched to trimming 1, a video image is taken, emphasizing the imaging subject that is fading into the scenery.

After performing the trimming, the controller 120 performs video capturing (Step S413). Then, the controller 120 returns to Step S403. Thus, in the process of FIG. 10, the video capturing is started when the detection of the face begins (that is, the controller 120 is triggered when the imaging subject comes into the screen), and is terminated when the detection of the face ends (that is, when the imaging subject goes out of the screen). Alternatively, the result of recognizing the speech input at the speech-data acquiring unit 112 or the posture detected by the posture detecting unit 114 may be used to trigger the controller 120, thereby to cause the controller 120 to start or terminate the video capturing. That is, the moving-picture photographing may be started or terminated when a specific speech or posture is detected.

As has been described, in this embodiment the trimming range is set in accordance with the motion of the imaging subject. The embodiment can therefore take a video image that emphasizes the motion of the imaging subject.

While certain embodiments have been described, the embodiments are not intended to limit the scope of the inventions. Various modifications or applications can, of course, be made without departing from the scope and spirit of this invention. The embodiments perform image capturing in consideration of the interesting features of the imaging subject, and can therefore be applied to security use, in monitoring cameras, cameras installed in cars, and the like. In recent years, more and more cameras are used (including health-care robots) to monitor the elderly or pets. Such a camera may also be used to not only monitor, but also predict the activity of the imaging subject. This embodiment can be applied to achieve such predictive technology, as well. Moreover, the embodiment can reduce the communication load of transmitting the image data, because a part of the image data is extracted by trimming.

Each process performed in the embodiment can be stored as a program that the controller 120, i.e., a computer, can execute. Furthermore, the process can be stored in a recording medium for use in external storage apparatuses, such as a memory card (e.g., ROM card or RAM card), a magnetic disk (e.g., hard disk), an optical disk (e.g., CD-ROM or DVD) or a semiconductor memory, and can be distributed in the form of a recording medium. Then, the controller 120 can read the program from the recording medium and perform controls in accordance with the program to perform the process.

What is claimed is:

1. An image processing apparatus, comprising:
a main subject detector configured to detect a position of a main subject in input image data;
a motion detector configured to detect a motion of the main subject; and
a trimming-position setting controller configured to set a trimming range of image data based on the position of the main subject detected by the main subject detector and the motion of the main subject detected by the motion detector,
wherein the trimming-position setting controller:
   sets, as the trimming range, a first trimming range in a manner to provide a space in the same direction as a moving direction of the main subject, if it is detected that a motion of the main subject is slower than a predetermined motion and it is detected that the main subject is present at a predetermined position other than a center of a screen in the image data;
   sets, as the trimming range, a second trimming range in accordance with the motion of the main subject, if it is detected that the motion of the main subject is faster than the predetermined motion or it is detected that the main subject is present at the center of the screen in the image data; and
   sets, as the trimming range, a third trimming range in a manner shifted by a predetermined value in the moving direction of the main subject, if it is detected that the motion of the main subject is slower than the predetermined motion and it is detected that the main subject is not present at the predetermined position or the center of the screen in the image data.

2. An image processing method, comprising:
detecting a position of a main subject in input image data;
detecting a motion of the main subject; and
setting a trimming range of image data based on the detected position of the main subject and the detected motion of the main subject;
wherein setting the trimming range of image data comprises:
   setting a first trimming range in a manner to provide a space in the same direction as a moving direction of the main subject, if it is detected that a motion of the main subject is slower than a predetermined motion and it is detected that the main subject is present at a predetermined position other than a center of a screen in the image data;
   setting a second trimming range in accordance with the motion of the main subject, if it is detected that the motion of the main subject is faster than the predetermined motion or it is detected that the main subject is present at the center of the screen in the image data; and
   setting a third trimming range in a manner shifted by a predetermined value in the moving direction of the main subject, if it is detected that the motion of the main subject is slower than the predetermined motion and it is detected that the main subject is not present at the predetermined position or the center of the screen in the image data.

* * * * *